United States Patent
Takahashi et al.

[11] Patent Number: 5,993,953
[45] Date of Patent: Nov. 30, 1999

[54] LAMINATED PAPER FOR CUSHIONING MATERIAL

[75] Inventors: Jiro Takahashi, Yokohama; Fumitoshi Ishikawa, Tokyo, both of Japan

[73] Assignees: Hitachi Electronics Services Co., Ltd.; Mishima Paper Co., Ltd., both of Tokyo, Japan

[21] Appl. No.: 08/827,596

[22] Filed: Mar. 28, 1997

[30] Foreign Application Priority Data

Mar. 29, 1996 [JP] Japan ................................. 8-076700

[51] Int. Cl.$^6$ ................................................ D21H 11/00
[52] U.S. Cl. ................................. 428/311.71; 428/195
[58] Field of Search ........................ 428/537.5, 511, 428/512, 336, 195, 342, 166, 507; 410/154

[56] References Cited

U.S. PATENT DOCUMENTS

| | | | |
|---|---|---|---|
| 5,405,370 | 4/1995 | Irani | 607/104 |
| 5,658,646 | 8/1997 | Takano | 428/195 |

OTHER PUBLICATIONS

Patent Abstracts of Japan vol.096, No. 005, May 31, 1996 & JP 08 002557 A (Canon Pack KK), Jan. 9, 1996 *abstract*.
Patent Abstracts of Japan, vol. 095, No. 009, Oct. 31, 1995 & JP 07 165266 A (Hitachi Electron Service Co., Ltd.), Jun. 27, 1995 *abstract*.
Patent Abstracts of Japan, vol. 014, No. 470 (C–0769), Oct. 15, 1990 & JP 02 191799 A (Kurary Co. Ltd.), Jul. 27, 1990 *abstract*.

*Primary Examiner*—Deborah Jones
*Assistant Examiner*—Darlene David
*Attorney, Agent, or Firm*—Antonelli, Terry, Stout, & Kraus, LLP

[57] ABSTRACT

A laminated paper, including a water soluble polyvinyl alcohol layer of 15–40 $\mu$m thickness having an air permeability of 800,000 seconds/100 ml or higher, a total thickness of 40–100 $\mu$m and a lengthwise softness of 50 g or less. The laminated paper has high air permeability, extremely superior in air tightness, water soluble, and easy to dispose and recycle. Furthermore, there is no static electricity generated, it is strong in heat sealing, and it has conversion performance. Plus, in the safety aspect, it is non-toxic, waste is safe, and when cushioning material 10 is formed, disposal process is easy as the water soluble PVA film and the paper base are both biodegradable. This laminated paper is an environment friendly industrial material.

9 Claims, 3 Drawing Sheets

| Areal load N/cm² | Number of tests | When setting measurement jig. Load:0.8kg | With load. | Thickness of test specimen after test at certain hours. Unit:mm | | | | | | | | | | | |
|---|---|---|---|---|---|---|---|---|---|---|---|---|---|---|---|
| | | | | Day 1 | | | | | | Day 2 | Day 3 | Day 4 | Day 5 | Day 6 | Day 7 | Day 14 |
| | | | | 1H | 6H | 12H | 24H | 48H | 72H | 96H | 120 H | 144 H | 168 H | 336 H |
| 0.29 0.03 Kgf/cm² | 1 | 50.0 | 48.0 | 46.8 | 45.4 | 45.0 | 44.2 | 43.4 | 43.0 | 42.2 | 41.8 | 41.6 | 41.4 | 38.8 |
| | 2 | 50.0 | 48.8 | 48.2 | 47.4 | 46.6 | 45.6 | 45.0 | 45.2 | 44.8 | 44.2 | 44.0 | 43.8 | 42.0 |
| | 3 | 50.0 | 49.0 | 47.4 | 46.2 | 45.4 | 45.0 | 44.4 | 43.8 | 43.4 | 43.0 | 42.4 | 42.2 | 39.4 |
| | Average | 50.0 | 48.6 | 47.5 | 46.3 | 45.7 | 44.9 | 44.3 | 44.0 | 43.5 | 43.0 | 42.7 | 42.5 | 40.1 |
| | Distortion rate | - | 0.0 | 2.3 | 4.7 | 6.0 | 7.5 | 8.9 | 9.5 | 10.6 | 11.5 | 12.2 | 12.6 | 17.6 |
| 0.49 0.05 Kgf/cm² | 1 | 50.0 | 47.0 | 45.8 | 44.2 | 42.6 | 41.2 | 40.0 | 39.2 | 38.4 | 37.6 | 37.0 | 36.8 | 32.6 |
| | 2 | 50.0 | 48.2 | 47.0 | 45.2 | 43.4 | 42.2 | 41.2 | 40.4 | 39.6 | 38.6 | 38.0 | 37.8 | 34.0 |
| | 3 | 50.0 | 48.6 | 46.6 | 45.4 | 44.6 | 43.4 | 42.4 | 41.6 | 40.8 | 40.2 | 39.4 | 39.0 | 35.2 |
| | Average | 50.0 | 47.9 | 46.5 | 44.9 | 43.5 | 42.3 | 41.2 | 40.4 | 39.6 | 38.8 | 38.1 | 37.9 | 33.9 |
| | Distortion rate | - | 0.0 | 3.1 | 6.3 | 9.2 | 11.8 | 14.0 | 15.7 | 17.4 | 19.1 | 20.4 | 21.0 | 29.2 |
| 0.69 0.07 Kgf/cm² | 1 | 50.0 | 46.8 | 45.2 | 43.2 | 41.2 | 39.0 | 37.2 | 36.0 | 35.0 | 34.2 | 33.4 | 32.8 | 27.2 |
| | 2 | 50.0 | 46.4 | 45.0 | 42.8 | 41.0 | 39.2 | 37.4 | 35.6 | 34.4 | 33.4 | 32.6 | 32.0 | 26.0 |
| | 3 | 50.0 | 45.6 | 44.4 | 42.2 | 39.8 | 37.6 | 35.6 | 34.4 | 33.4 | 32.6 | 32.0 | 31.6 | 26.4 |
| | Average | 50.0 | 46.3 | 44.9 | 42.7 | 40.7 | 38.6 | 36.7 | 35.3 | 34.3 | 33.4 | 32.7 | 32.1 | 26.5 |
| | Distortion rate | - | 0.0 | 3.0 | 7.6 | 12.1 | 16.6 | 20.6 | 23.6 | 25.9 | 27.8 | 29.4 | 30.5 | 42.7 |

5,993,953

LAMINATED PAPER FOR CUSHIONING MATERIAL

FIELD OF THE INVENTION

This invention relates to a compressed gas filled type laminated paper for cushioning material having recyclability and biodegradability.

BACKGROUND OF THE INVENTION

Packaging has always been required when transporting goods, and the most popular method of packaging has been to place the goods in a carton box, fill cushioning material in the gap between the carton and the goods to protect the goods from impact due to shifting of the goods and vibration or shock from outside.

Generally speaking, cushioning material used for packaging can be categorized into granular cushioning material, which is used as is in separate condition or packed in a bag, and sheet type cushioning material, which is used by wrapping the goods before placing in the container, and they both belong to filling cushioning material group.

Furthermore, cushioning material can be classified in terms of raw material into plastic strain, paper strain, starch strain, etc. The plastic strain includes granular and sheet cushioning material made of polystyrene foam (EPS), polyethylene foam (EPE), polypropylene foam (EPP), copolymer of ethylene and styrene, polyurethane foam, etc. The paper strain includes sheet cushioning material made of corrugated fiberboard, molded pulp, triplex kraft paper, paper core, etc. The starch strain includes granular cushioning material made of hybrid corn starch, etc.

Cushioning material and packaging material take the form of throw-away material due to the ease of distribution, and they are disposed when they finish playing the role of protecting the package contents. On the other hand, cushioning material tends to be larger in disposal volume than packaging material, and therefore, a place for storage and disposing process have been problems. To solve the problem of storage space, compressed gas filled type cushioning material, which can absorb external vibration and shock may be made by blowing air, etc. into a sealed bag type sheet material like a balloon has been used recently. The raw material for such sheet material must have air permeability, and must be hard to pass air through, and a laminated sheet of plastic strain film, such as polyethylene and nylon, or plastic sheet, such as nylon, or polyethylene laminated on paper material, such as kraft paper, may be used.

In the meantime, as such plastic strain material has problems of causing high heat or toxic gas when incinerated, it was impossible to dispose of it in an incinerator. As a result, the only possible method of disposing was to earth fill as industrial wastes.

These filled wastes, however, cannot be decomposed in a natural environment, but cause land filling shortage or environmental pollution. Therefore, disposing is subject to severe restriction recently.

Furthermore, while the material made by laminating polyethylene, etc. onto paper strain material decreases such problem, it could not completely solve the environmental problem as it uses polyethylene. And, if you try to separate paper strain material only for paper recycling, separation from the laminated plastic film is extremely difficult, requiring special equipment, and as a result, the paper collection system was not established and plastic laminated paper itself has been disposed or incinerted as a matter of fact.

As the paper strain and starch strain material as described above cause less heat when incinerated and are collectable and recyclable as ordinary garbage, and both are biodegradable and easily disposable even if they are left in natural environment, official gazette Toku-Kai-Hei 7-189182 discloses a sheet for cushioning material made by providing a polyvinyl alcohol coating layer over a paper sheet of carboxy denaturated polyvinyl alcohol size pressed woodfree paper which will last for approximately four days use if a cushioning material is made out of this sheet. As this sheet has high rigidity, air tightness at any crease is not enough, and the sheet lacks flexibility as a compressed air filled cushioning material, plus heat sealability is not taken into consideration, resulting in problems in terms of practical use.

SUMMARY OF THE INVENTION

The present invention is intended to provide a laminated paper for cushioning material with which a cushioning material of compressed gas filled type, having air tightness equivalent or better to the case of plastic strain material, heat sealability, recyclability and biodegradability, and high flexibility, can be made easily.

The basic structure of the laminated paper for cushioning material under this invention is such that a layer of water soluble polyvinyl alcohol of 15–40 $\mu$m thickness is provided over a paper base, its air permeability is 800,000 seconds/100 ml or higher, total thickness is 40–100 $\mu$m, and softness of the paper lengthwise is 50 g or less.

BRIEF DESCRIPTION OF THE DRAWINGS

FIG. 5 is a chart showing the result of a compression proof test.

BEST MODE OF THE INVENTION

The laminated paper under this invention has an air permeability of 800,000 seconds/100 ml or higher. It is desirable to have an air permeability of 870,000 seconds/100 ml or higher, and even better to have an air permeability of 1,000,000 seconds/100 ml or higher. As the plastic strain cushioning material of air mat type, which has been commonly used in the past, has an air permeability of 871,000 seconds/100 ml, it can be said that this material has an equivalent level of air tightness to the conventional material.

As the thickness of this laminated paper for cushioning material is 100 $\mu$m or less, and the softness of the laminated paper lengthwise as measured by handle a O meter is 50 g or less, this material has adequate softness suitable for forming. As most of the compressed air filled cushioning material are made into relatively small bags of approximately 15 cm×15 cm and sometimes are formed into a complicated shape bag, where many thin long bags are lined up side by side, softness of the material is required. Desirable softness of the laminated paper lengthwise as measured by a handle O meter is 40 g or less.

Furthermore, the upper limit of the thickness of the laminated paper for cushioning material shall be 90 $\mu$m or less, preferably 80 $\mu$m or less, and most desirably 70 $\mu$m or less.

This is because, if the total thickness of the laminated paper for cushioning material, where water soluble polyvinyl alcohol (PVA) is laminated on paper base, exceeds 100 μm or if the softness of the laminated paper lengthwise as measured by a handle O meter exceeds 50 g, the laminated paper for cushioning material becomes too hard, and it will be difficult to form bags, complicated shape bags in particular. Furthermore, when air is blown into the bag after forming, and the bag sealed to make a balloon like compressed air filled cushioning material, the heat sealed portion where two sheets of laminated paper overlap becomes stiff, and there will be more bending as the bag blows up, making it difficult to blow an adequate amount of air. Stiff and less air cushioning material is not only difficult to use but also performs less well as a cushioning material. Therefore, by limiting the thickness of the laminated paper for cushioning material in this embodiment to 90 μm or less, preferably to 80 μm or less, and most desirably to 70 μm or less, a material having flexibility can be created.

The laminated paper for cushioning material is made by laminating a water soluble PVA film of 15–40 μm thickness onto a paper base using PVA resin as an adhesive, or by creating a water soluble PVA resin layer of 15–40 μm thickness over a paper base by extrusion lamination of water soluble PVA resin.

The air permeability of laminated paper for cushioning material constructed as such will be determined almost solely by the laminated water soluble PVA layer. The saponification degree of the water soluble PVA film used for lamination by adhesive does not matter, whether it is partial saponification or complete saponification. However, unless the cushioning material is to be used in a high humidity environment, 80–95 mol % saponification degree is desirable from the aspect of easy recycling, polymerization degree of 500–2500 is common, and film thickness shall be 15–40 μm or desirably 20–30 μm.

If the PVA film thickness is less than 15 μm, there is a danger of uneven air permeability, and the necessary air permeability is obtained at the thickness of 40 μm or less. If the thickness exceeds 40 μm, manufacturing cost will increase. Here, cold water soluble polyvinyl alcohol (PVA) film (such as the one known by product name "SOLUBLON KA30 μm, KL25 μm" made by Aicello Chemical Co., Ltd.) is suitable for this application.

While there is no certain limitation to the polymerization degree of the PVA resin used as the adhesive, 500–3000 is the appropriate level, and partial saponification or complete saponification can be selected, depending on the coating performance and bond strength required.

As for the PVA resin to be used in creating a polyvinyl alcohol layer by molten extrusion lamination, saponification degree of 20–80 mol % and polymerization degree of 100–2000 are desirable. The thickness of PVA layer to be created by extrusion lamination shall be 15–40 μm, preferably 15–30 μm, and most desirably 15–25 μm. If the thickness of the polyvinyl acohol layer is less than 15 μm, it will be affected by the irregularity of the paper base surface, which tends to cause uneven PVA layer thickness, and if the thickness exceeds 40 μm, manufacturing cost will increase. The processing temperature for extrusion lamination must be controlled to be 20° C. or less to prevent resin degradation. The typical example of suitable cold water soluble thermoplastic polyvinyl alcohol (PVA) resin for this application is the one known under the product name of "CP1210" made by Kuraray Co., Ltd.

As explained above, while there are two types of laminated paper for cushioning material, one made by laminating PVA film on paper base and the other made by creating a PVA layer over the paper base by extrusion lamination, the laminated paper made by laminating a film on paper base by adhesive is more desirable because it has a higher tensile energy amount (TEA), and a higher anti-shock performance can be expected as a cushioning material.

While the thickness of the paper base used for this laminated paper for cushioning material can be selected within the range of subtracting PVA layer thickness from the laminated paper thickness, the lower limit shall be 25 μm, which is approximately 20 g/m$^2$, when considering the conversion suitability for lamination or extrusion lamination. And the upper limit of the paper thicknes shall be 80 μm, preferably 70 μm, more preferably 60 μm, and most desirably 50 μm.

Regarding the softness of the laminated paper, the smaller the value measured by handle O meter is, softer the laminated paper is for cushioning material.

And the flexibility of the laminated paper depends on the softness of the paper base used.

As the fiber orientation degree and rigidity of the paper base is higher in its paper making direction, in other words lengthwise, the softness value of the laminated paper for cushioning material as measured by the handle O meter will be higher lengthwise than crosswise. Therefore, the lengthwise value will be more important in evaluating the suitability of the laminated paper for cushioning material. The softness of the PVA layer is very soft. For example, the softness of the cold water soluble PVA film (product name "SOLUBLON KA, 30 μm, 50 μm, 25 μm" made by Aicello Chemical Co., Ltd.), which is the PVA film in this case, is 2.0 g, 4.5 g and 1.9 g, respectively. The difference of softness between the lengthwise value of the laminated paper using adhesive or the laminated paper made by creating a PVA layer over the paper base by extrusion lamination and that of the paper base will naturally vary depending on the combination of each layer. Under this embodiment, the difference of softness was within the range of 3–8 g as a result of measuring various combinations. Therefore, the softness of the paper base used lengthwise is considered to be appropriate if 50 g or less, preferably 47 g or less, and most desirably 37 g or less.

As the air permeability is determined by the PVA layer, there is no restriction to the air permeability of the paper base itself.

The paper base used for the laminated paper for cushioning material is made from one or multiple mixed Fiber having biodegradability such as various non-wood pulps including needle-leaved tree bleached kraft pulp (hereinafter called NBKP), broad-leaved tree bleached kraft pulp (hereinafter called LBKP), flax, Manila hemp and kenaf, rayon fiber for paper making and PVA fiber binder. Considering the recyclability, the use of NBKP or LBKP is desirable.

Raw pulp is dispersed in water, the slurry beaten by refinery is diluted and becomes the stock for paper making. At this time, coloring agent such as the filler, the dye and the pigment, internal sizing agent, the fixer, and the paper strength increasing agent can be added as necessary.

Furthermore, surface sizing using a size press can be applied, or it can be a coated paper by using on-machine gate roll coater. Incidentally, in these cases, adhesion of the paper base and the PVA layer can be improved by mixing PVA into the coating liquid.

In case of the same areal weight paper, thinner the thickness is, lower the rigidity is. Therefore, it is necessary to make the paper base thickness thin to make a laminated paper for a soft cushioning material. It is most effective to apply a calender process to the paper base to make a thin paper base. As the calender process makes the density higher, the thickness can be made thinner.

Two methods of a calender process can be applied to the paper base, a machine calender method where chilled rolls are combined, and a super calender method where a chilled roll and an elastic roll are combined. As the calender process also improves the paper surface smoothness, the amount of adhesive for laminating polyvinyl alcohol (PVA) film onto paper base can be lessened. Such a paper base is desirable for extrusion lamination, too, as the variation of the polyvinyl alcohol layer thickness becomes small.

Furthermore, a high beating process of the raw pulp is one way to lessen the paper base thickness. In other words, as the higher beating process will result in higher paper base density, the paper thickness can be made smaller.

Another way of making the paper thickness small is to include a filler in the paper base. As the specific gravity of the filler is twice or more compared to that of the pulp fiber, inclusion of the filler will make the paper base density higher. While the thickness decrease by a calender process will be great for the filler including paper, the strength will also decrease. So, it is desirable to keep the filler content to 30% or less.

A desired type of paper base can be manufactured by employing one or more of, the three methods, the calender process, the pulp beating process, and the filler inclusion process and selecting the appropriate ratio thereof.

The density of the paper base as manufactured by the above method shall be 0.75 g/cm$^3$ or higher, preferably 0.8 g/cm$^3$, and most desirably 0.85 g/cm3.

This laminated paper can use a water dispersing paper as the paper base.

Water dispersing paper is a sheet made from carboxymethyl cellulose sodium chloride fiber and wood pulp fiber, which is bulky having a density of 0.5 g/cm$^3$, and it is quite soft comparing to other types of paper made from wood pulp only. As the water dispersing paper starts swelling within 30 seconds when simply placed in water and dissolves in 2–3 minutes, a cushioning material for packaging this is extremely easy to dispose can be provided. Incidentally, water dispersing paper means a laminated paper for cushioning material which cannot maintain its sheet shape and dissolves or disperses into very small strips or individual fiber within a very short period of time of one minute or so when placed in slowly circulating water. For example, a paper under the product name of "DISSOLVO 30MDP, 30CD-2" made by Mishima Paper Manufacturing Co., Ltd. can be used as a water dispersing paper of 30 g/m$^2$ areal weight.

This laminated paper for cushioning material is made by laminating a water soluble polyvinyl alcohol film of 15–40 μm thickness onto a paper base, using polyvinyl alcohol resin as the adhesive, or by creating a 15–40 μm layer of water soluble polyvinyl alcohol over a paper base by extrusion lamination of a water soluble polyvinyl alcohol resin over a paper base. And as this laminated paper has characteristics of 800,000 seconds/100 ml or higher air permeability, total thickness of 45–100 μm, and the softness of the lamianted paper for cushioning material lengthwise as measured by handle O meter of 50 g or less, it has the same or better air tightness as the laminated paper using plastic strain material. As it also has a heat sealability, compressed air filled cushioning material can be easily made. The resultant cushioning material is soft, and therefore, easy to use, and performs well in protecting the package content. If it is to be thrown away after use, it is superior in recyclability, as it can be easily torn by something pointed; it requires less space for storage until collection, and it can be processed as ordinary waste paper requiring no special recycling process. When disposing, heat generated at the time of incineration is low, and even if it is left in the natural environment, the danger of causing environmental pollution is extremely low as all the costituents have biodegradability.

Furthermore, as the paper base and PVA film do not generate static electricity, there will be less trouble in later conversions, such as printing, making it an easy to handle material.

EXAMPLES OF EMBODIMENTS

Examples of embodiments of the laminated paper for cushioning material under this invention and valuation thereof are described below. Parts and percentages described are all based on weight, and the coating amount is described in terms of the weight of the solid part.

The measuring method for air permeability, lengthwise softness of the sheet, and tensile energy amount (TEA) measured for valuation purpose are as follows.

Air permeability

Measurement was made by using an Oken type air permeability meter (made by Asahi Seiko Co., Ltd.).

The time for 100 ml of air to permeate through an area of 645 m/m$^2$ is measured and indicated in seconds, and the larger the value is, the lower the air permeability is.

Lengthwise softness of the sheet

A handle O meter made by Kumagai Riki Kogyo Co., Ltd. is used, and the load when a test specimen (width×paper making direction of a sheet=114 mm×224 mm) is pushed into a slit of 10 mm is measured and indicated. The lower the value is, the softer the specimen is.

This test method is in accordance with the softness test method for sanitary tissue paper under J. TAPPI paper and pulp test method No.34-80.

Tensile energy amount (TEA)

The energy amount required when breaking the test specimen by a constant velocity expansion type tester per unit area of the test specimen is indicated as the tensile energy amount (or toughness) according to the following equation.

$$TEA(kg \cdot m/m^2) = 100A/LW$$

Here,

TEA: Tensile energy amount (kg·m/m$^2$)

A: The area surrounded by the stress-distortion line (kg·cm)

L: Grip distance (cm) w: Test specimen width (cm)

Measurement was made by using Tensilon Universal tensile tester (made by Orientech Co., Ltd.).

This test is in accordance with the TAPPI T494om-81 paper and paper board tensile breakage charcteristics test method.

Embodiment Example 1

Raw pulp was obtained by beating a mixed pulp of NBKP 60 parts and LBKP 40 parts up to 60° SR by a refiner. After adding 1 part of neutral size agent and 5 parts of cationic starch to 100 parts of the raw pulp, the mixture was diluted to obtain a completed stock, made into a paper by a Fourdrinier multi cylinder type paper machine, then coated by size press with a 5% coating liquid consisting of 25 parts of PVA (product name "DENKA SIZE A-50" made by Denki Kagaku Co., Ltd.), 19 parts of oxidized starch (product name "SK100" made by Nippon Corn Starch Co., Ltd.) and 6 parts of water resisting agent (product name "SUMIREZ 633" manufactured by Sumitomo Chemical Co., Ltd.), and a base paper of 35 g/m² areal weight was obtained.

This base paper was processed through a super calender with 8% water, roll surface temperature of 8020 C., nip pressure of 230 kg/cm by 9 nips, and a high density paper base I was obtained.

Paper base I has a density of 0.952 g/cm³, air permeability of 50,000 seconds/100 ml, and sheet lengthwise softness of 30.6 g.

Paper base I and water soluble PVA film (product name "SOLUBLON KA30" made by Aicello Chemical Co., Ltd.) of 30 μm thickness were laminated using an adhesive of PVA resin with polymerization degree of 1000, saponification degree of 88 mol % made into a 10 wt % ethyl alcohol solution, and a laminated paper for cushioning material was obtained.

Embodiment Example 2

A laminated paper for cushioning material was obtained by providing a PVA layer of 20 μm over the same paper base I by extrusion lamination using a cold water soluble plastic PVA resin (product name "CP1210" made by Kuraray Co., Ltd.).

Embodiment Example 3

A laminated paper for cushioning material was obtained by providing a PVA layer of 40 μm over the same paper base I by extrusion lamination using a cold water soluble plastic PVA resin product name "CP1210" made by Kuraray Co., Ltd.).

Embodiment Example 4

Water dispersing paper (product name "DISSOLVO 30MDP" made by Mishima Paper Manufacturing Co., Ltd.) having areal weight of 30.2 g/m², density of 0.462 g/cm³, air permeability of 0.5 second/100 ml and sheet lengthwise softness of 17 g was used as the paper base. Other conditions in Embodiment Example 1 were maintained, and a laminated paper was obtained.

Embodiment Example 5

A laminated paper was obtained similarly to Embodiment Example 2 except that 30MDP was used and PVA layer thickness was made to be 35 μm,

Embodiment Example 6

A laminated paper was obtained similarly to Embodiment Example 5 except that PVA layer thickness was made to be 15 μm.

Embodiment Example 7

An extrusion lamination paper was obtained similarly to Embodiment Example 2 except that water dispersing paper (product name "DISSOLVO 30CD-2" made by Mishima Paper Manufacturing Co., Ltd.) having areal weight of 30.0 g/m², density of 0.545 g/cm³, air permeability of 0.5 second/100 ml and sheet lengthwise softness of 20 g was used as the paper base and that PVA layer thickness was made to be 15 μm.

Comparison Example 1

An extrusion lamination paper was obtained similarly to Embodiment Example 2 except that water dispersing paper (product name "DISSOLVO 60CD-2" made by Mishima Paper Manufacturing Co., Ltd.) having areal weight of 61.3 g/m², density of 0.632 g/cm³ and air permeability of 12 seconds/100 ml was used as the paper base and that PVA layer thickness was made to be 15 μm.

Comparison Example 2

An extrusion lamination paper was obtained similarly to Embodiment Example 2 except that water dispersing paper (product name "DISSOLVO 60MDP" made by Mishima Paper Manufacturing Co., Ltd.) having areal weight of 62.4 g/m², density of 0.545 g/cm³ and air permeability of 1.0 second/100 ml was used as the paper base and that PVA layer thickness was made to be 20 μm.

Comparison Example 3

An extrusion lamination paper was obtained similarly to Embodiment Example 2 except that water dispersing paper (product name "DISSOLVO 120MDP" made by Mishima Paper Manufacturing Co., Ltd.) having areal weight of 123.3 g/m², density of 0.615 g/cm³ and air permeability of 10 seconds/100 ml was used as the paper base and that PVA layer thickness was made to be 40 μm.

Physical properties of the laminated papers in the above Embodiment Examples and Comparison Examples are described in Table 1.

As it is clear from Table 1, the use of high density paper base I (Embodiment Examples 1, 2 and 3) is more suitable as a cushioning material due to its greater tensile energy amount, while the rigidity of the laminated paper made by laminating a film by adhesive is slightly greater than the case of extrusion lamination.

As shown in Comparison Examples 1–3, when water soluble paper is used as the paper base, the thickness of the laminated paper becomes great, making it a highly rigid sheet, and therefore the paper lacks fitness as a cushioning material, except the one paper having the areal weight of 30 g/m².

In both cases of Embodiment Examples and cases of Comparison Examples, when bags in the size of width×flow direction=14.5 cm×19 cm were made by a cushioning material bag making machine where laminated paper is heat sealed to make bags, air is blown into the bags, then the bags are finally sealed by heat sealing, it was verified that either case is superior in heat sealability. On the other hand, laminted papers in Comparison Examples 1–3 were so rigid that softness could not be measured, distortion at the heat sealed portion was great when inflated, the level of inflation of the cushioning material was not even, and the bag was so stiff that it was difficult to use.

Embodiment Example 8

Raw pulp was obtained by beating a mixed pulp of NBKP 80 parts and LBKP 20 parts up to 80° SR by a refiner. After adding 1 part of neutral size agent and 3 parts of cationic starch to 100 parts of the raw pulp, it was diluted to obtain a completed stock, made into a paper by a Fourdrinier multi cylinder type paper machine, and a base paper of 20 g/m² areal weight was obtained. This base paper was processed through a super calender with 3% water, roll surface temperature of 60° C., nip pressure of 160 kg/cm by 7 nips, and paper base II was obtained.

Paper base II has a density of 0.765 g/cm³, air permeability of 7,500 seconds/100 ml, and sheet lengthwise softness of 7.5 g.

A laminated paper for cushioning material was obtained by laminating a PVA film similarly to Embodiment Example 1 except that paper base II was used. This laminated paper has a thickness of 58.4 μm, air permeability of 1,600,000 seconds/100 ml, and laminated paper lengthwise softness of 15.2 g.

Embodiment Example 9

A laminated paper for cushioning material under this invention was obtained by extrusion lamination similarly to Embodiment Example 2 except that rear carbon copying paper (product name "41MCP RENDEN R (3)" made by Mishima Paper Manufacturing Co., Ltd.) including precipitated calcium carbonate, mainly as the internal filler, and indicating considerably high ash value of 12.3%, having a density of 0.860 g/cm³, air permeability of 2,140 seconds/100 ml and a sheet lengthwise softness of 31.9 g was used as the paper base.

This laminated paper has a thickness of 66.8 μm, air permeability of 1,350,000 seconds/100 ml, and sheet lengthwise softness of 35.4 g.

Embodiment Example 10

Raw pulp was obtained by beating 100 parts of LBKP up to 31° SR by a refiner. After adding 2 parts of acid size agent and 5 parts of aluminium sulfate to 100 parts of the raw pulp, the mixture was diluted to obtain a completed stock, made into a paper by a Fourdrinier multi cylinder type paper machine, a 7% coating liquid consisting of 100 parts of oxidized starch (product name "SK100" made by Nippon Corn Starch Co., Ltd.) and 9 parts of water resisting agent (product name "SUMIREZ 633" manufactured by Sumitomo Chemical Co., Ltd.) was coated by a size press, and a base paper of 35 g/m² areal weight was obtained.

This base paper was processed through a super calender with 3% water, roll surface temperature of 60° C., nip pressure of 150 kg/cm by 3 nips, and paper base III was obtained. Paper base III has a density of 0.828 g/cm³, air permeability of 20 seconds/100 ml, and a sheet lengthwise softness of 43.8 g. A laminated paper for cushioning material under this invention was obtained by extrusion lamination similarly to Embodiment Example 2 except that paper base III was used. This laminated paper has a thickness of 62.0 μm, air permeability of 1,020,000 seconds/100 ml, and a sheet lengthwise softness of 47.4 g.

Embodiment Example 11

Paper base IV was obtained by a method similar to Embodiment Example 10 except that kaolin for internal filling (product name "KA" made by Daishun Kagaku Kogyo Co., Ltd.] was added to the pulp stock in a way to make the internal filler content of the base paper 10%. Paper base IV has a density of 0.891 g/cm³, an air permeability of 15 seconds/100 ml, and a sheet lengthwise softness of 38.2 g. A laminated paper for cushioning material was obtained by extrusion lamination similarly to Embodiment Example 10.

This laminated paper has a thickness of 59.3 μm, air permeability of 1,100,000 seconds/100 ml, and sheet lengthwise softness of 41.7 g.

Next, the change of air permeability was tested by making creases to the laminated paper as disclosed in official gazette Toku-Kai-Hei 7-189182 using laminated papers of Embodiment Examples 1–11. The first crease was made on the front side of the sheet, and a 160 mm wide roll with 1 kg load made to travel back and forth over the crease, then the same crease was folded reversely toward the rear side, the loaded roll made to travel over it similar to the front side, then the sheet was rotated 90° and folded to the front and rear in a way to make a cross by this crease and the previous crease, the cross of the creases was set to the center of the air permeability measurement section, and air permeability was tested.

As a result, it was verified that each variation of air permeability stayed within the range of variation of the laminated paper before making the creases, and that there was no change.

Bags were made by the cushioning material bag making machine as described above using laminated papers of Embodiment Examples 8–11, and it was verified that each one has fitness as a cushioning material. The cushioning material of Embodiment Example 8 was especially superior in terms of softness. Embodiment Example 10 was very close to the limit in terms of softness.

In addition to the above, performance evaluation tests as follows were conducted.

A prototype compressed air filled cushioning material (air bag) was made using the material of Embodiment Example 1, and its performance was evaluated by static load and dynamic load tests.

In making the prototype compressed air filled cushioning material, laminated paper of Embodiment Example 1 where paper base I and 30 μm thick PVA film were laminated by adhesive was used. This laminated paper was heat sealed in three directions and compressed air was filled to make a compressed air filled cushioning material.

Figure 1:
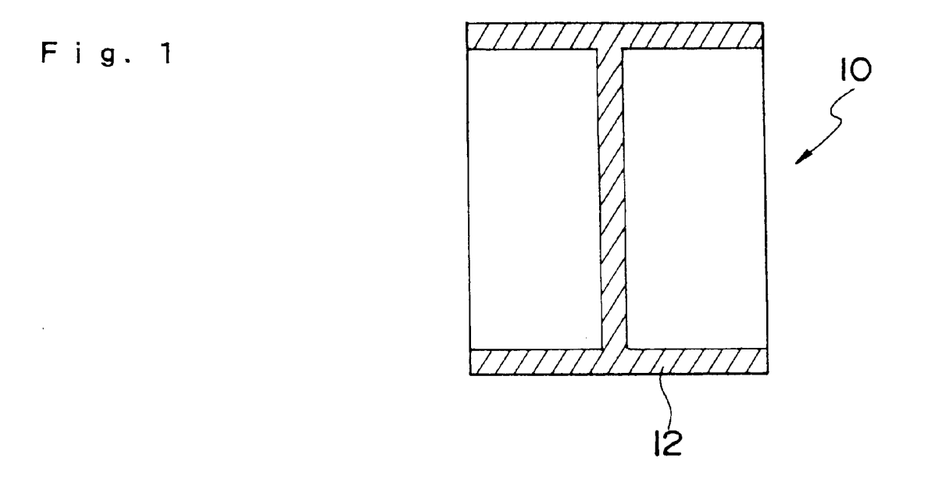
FIG. 1 is a plan view of the cushioning material before being filled with gas.
Figure 2:
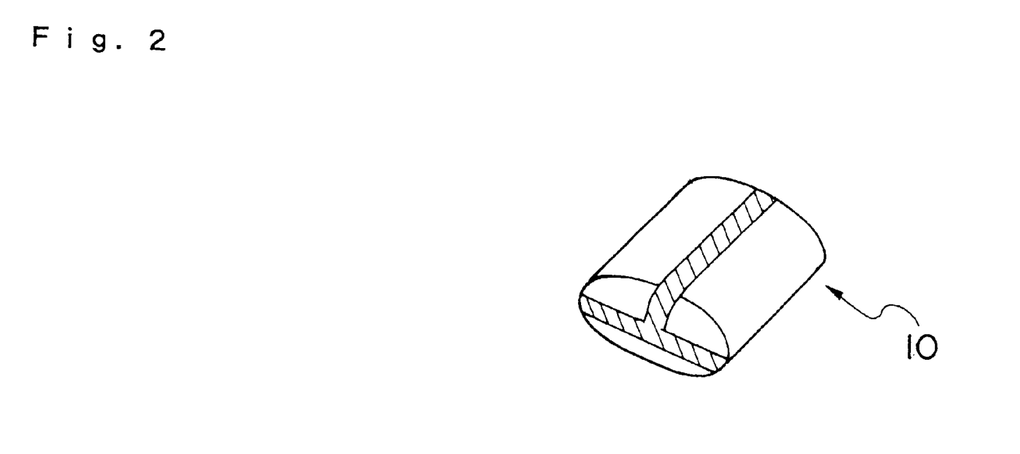
FIG. 2 is a perspective view of the filled cushioning material.

FIG. 1 is a plan view of bag making material (before filling air) heat sealed for the compressed air filled cushioning material, and FIG. 2 shows the compressed air filled cushioning material after air filling.

Cushioning material 10 is made by laminated paper, and before air filling, it forms a bag where the center, the top and the bottom 12 are heat sealed with the dimensions of width×length=16 cm×15 cm.

The cushioning material after air filling is made to have the dimensions of width×length×thickness=12 cm×12 cm×5 cm.

(1) Static load test

Pressure proof test by static load.

A bag was made and air was filled so that the compressed air filled cushioning material would have the above dimensions, pressure was applied to the maximum load at compression speed of 10 mm/min. by using the compression tester as specified in JIS. B7733, and measured.

The result indicates the distortion amount after compression compared to the cushioning material before compression and maximum value of the load.

Compression creep test by static load.

As in the case of pressure proof test by static load, an air filled cushioning material was placed between a flat moving plate and a fixed plate, previously compressed at a specified load, and measured. The compression method was in accordance with the method specified in JIS. K6767.

Figure 3:
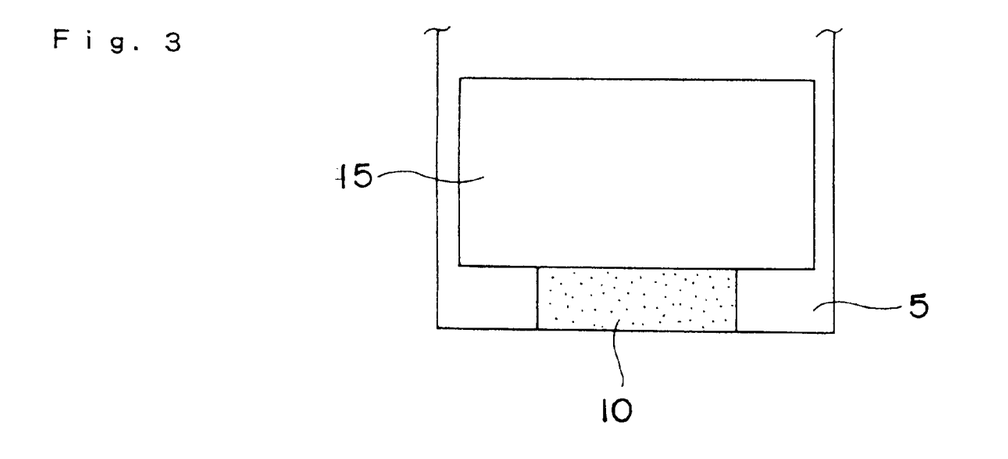
FIG. 3 is a plan view of a jig for a compressed creep test.

FIG. 3 is a plan view of a pressure jig used in the compression creep test by static load. Cushioning material 10 is placed on a fixing plate 5, and a load is applied by the moving plate 15 to compress the cushioning material 10. As for the compressive load, three levels, namely 0.03 kgf/c m², 0.05 kgf/c m², and 0.07 kgf/c m², were applied.

The change of dimension in the height direction (distortion amount) compared to the cushioning material before compression was measured as the time elapsed, and air decreasing history of the cushioning material due to the load over a maximum period of 14 days were described in terms of distortion amount and time.

(2) Dynamic load test.

Pressure proof test by dynamic load.

Air filled cushioning material was used as in the case of the compression test by static load, and a test was conducted by a drop tester of the vertical drop type.

The tester (see FIG. 4) measures the speed when the weight 20 hits the test specimen (cushioning material) 10. This tester comprises an acceleration converter 25 and a displacement gauge 27. In this test, the speed from the free fall height of 60 cm and 30 cm were used as references.

Figure 4:
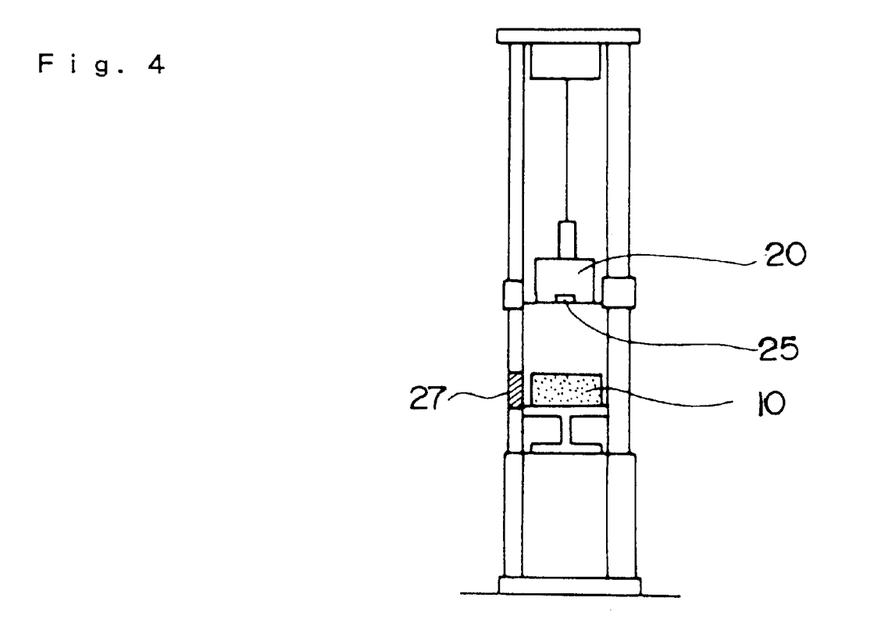
FIG. 4 is an explanatory drawing of a drop tester for compression proof test.

The acceleration when the weight 20 hits and distortion of the cushioning material 10 were measured. The same test was conducted on three peices of test specimen, then the mass of the load weight was increased, and impact was applied 5 times successively to each of the three pieces of test specimen.

The result indicates the maximum acceleration, distortion and stress at the point when the cushioning material loses its function.

This measurement is in accordance with JIS. Z0235.

Drop and impact test of a package by static load.

A content is wrapped by the cushioning material and dropped.

As in the case of pressure proof test by dynamic load, an air filled cushioning material is placed evenly in all directions, up and down, left and right, front and rear, surrounding the content which is placed in the center of the carton box. Such package is dropped downward 20 times successively from a drop height of 60 cm, and the acceleration when the content hits the cushioning material is measured, (according to JIS. Z0202).

Sizes of the three types of packages (A, B, C) tested are described in Table 2.

Acceleration for each drop is described, and durability and shock absorbing performance, etc. of the cushioning material are evaluated from the aspect of practical use.

TABLE 2

| Package | A | B | C |
| --- | --- | --- | --- |
| Corrugated fiberboard size (cm) | length × width × height 20 × 26 × 15 | length × width × height 30 × 47 × 21 | length × width × height 34 × 50 × 30 |
| Content Size | 10 × 16 × 5 | 25 × 37 × 11 | 24 × 40 × 20 |
| Content weight (kg) | 1 | 5 | 20 |
| Cushioning distance | 5 cm | 5 cm | 5 cm |
| Static load (kgf/cm$^2$) | 0.004 | 0.006 | 0.017 |
| Cushioning material quantity | 8 | 28 | 54 |

(3) Result

Result of pressure proof test by static load. (see Table 3)

Pressure proof strength of the cushioning material to a point where the material bursts is 162.6 kgf (0.88 kgf/cm$^2$) in average, and this value is well within the useful range. Here, the absolute guaranteed pressure strength obtained by deleting the maximum and the minimum value (4th and 5th measurement) is 0.868 kgf/cm$^2$ or higher.

TABLE 3

The result of pressure proof test by static load. The result of pressure proof test. (SI unit: 9.8 N = 1 kgf)

| Measurement item | | 1st test | 2nd test | 3rd test | 4th test | 5th test | Average | Maximum stress /cm$^2$: |
| --- | --- | --- | --- | --- | --- | --- | --- | --- |
| Compression Status | kgf | 134.0 Burst | 119.6 Burst | 121.3 Burst | 324.2 Air leakage | 114.0 Burst | 162.6 — | 0.88 |
| Distortion | mm | 34.7 69.4 | 33.5 67.0 | 29.0 58.0 | 41.0 82.0 | 30.2 60.4 | 33.7 67.4 | |

The result of pressure proof creep test by static load. (see FIG. 5)

The value of distortion rate when the content can no longer be fixed due to the gap between the content and the cushioning material caused by distortion of the cushioning material by the load is 30%.

The test result indicated distortion rate of 17.6% after holding an average thickness of 40.1 mm during a period of 14 days at 0.03 kgf/cm$^2$ load, which is only 9.9 mm distortion amount. Similarly, the distortion rate during a period of 14 days at 0.05 kgf/cm$^2$ load was 29.2%. In the case of the heaviest load of 0.07 kgf/cm$^2$, the distortion rate during a period of 7 days was 30.5%.

Generally speaking, majority of the packaged freight weigh 5 kg or less, which is 0.05 kgf/cm$^2$ or less when converted to areal load (see total load corresponding to areal load as indicated in Table 4). Therefore, in the case of 0.03 kgf/cm$^2$ areal load, the distortion rate is 30% or less even in the case of applying the load during a period of 14 days. Furthermore, 7 days can be guranteed even in the case of the heaviest load of 0.07 kgf/cm$^2$. These values are well within the range of usefulness without problem under the normal transportation environment.

TABLE 4

Total load corresponding to areal load.

| Areal load (kgf/cm$^2$) | 0.03 | 0.05 | 0.07 |
| --- | --- | --- | --- |
| Total load (kgf/90 cm$^2$) | 2.7 | 4.5 | 6.3 |

Furthermore, the use of cushioning material during a period of 4 days or so is stated in the official gazette Toku-Kai-Hei 7-189182, and if compared, 40% distortion rate is reached in 21 hours at 0.002 kgf/cm$^2$ load (0.3 kg load against 140c m$^2$), and the distortion rate exceeds 30% in almost a day. This is not acceptable for a cushioning material under normal expectation. On the other hand, the cushioning material using the laminated paper under this embodiment example can be used during a period of approximately 90 days (3 months) if calculation is made based on 0.002 kgf/cm$^2$, and therefore, it has incomparable performance.

The result of pressure proof test by dynamic load. (see Table 5)

If acceleration is compared, the drop height of 60 cm (100 G) is almost twice as high as the drop height of 30 cm (51 G), and it demonstrates a performance similar to a spring as a cushioning material. Furthermore, regarding the cushioning performance, the performance value when functioning as a cushioning material having a 3.7 times shock absorbing performance, compared to the test of corrugated fiberboard without using a cushioning material, is 0.012 kgf/cm$^2$ in terms of instantaneous maximum stress, and maximum distortion at that time is 70%. Therefore, while it is weak against instantaneous pressure compared to the case of static load, it can be adequately used as a cushioning material for packaged freight under normal expectation.

TABLE 5

The result of pressure proof test by dynamic load.

| | Maximum acceleration (G) | Maximum distortion (%) | Maximum stress kgf/cm² | Acceleration without cushioning material for reference. |
|---|---|---|---|---|
| Drop height 30 cm | 51 | 47 | 0.010 | 194 G |
| Drop height 60 cm | 100 | 70 | 0.012 | 350 G |

The result of drop cushioning test of packages by dynamic load. (see Table 6, Table 7 and Table 8)

What is especially important is acceleration change rate. Package A and B demonstrated a similar value with change rate of approximately 187% (20 times). As for package C, which was the heaviest, the change rate was 155% (20 times), which is low. On the other hand, in the cases of packages A, B and C as shown in Table 7, 4 pieces (7.4%) of package C burst.

In transportation of packaged freight under normal expectation, a drop from 60 cm height in one trip is only 3% (once or so) of the total drops, and therefore, compared to such actual situation, this test was conducted under much more severe conditions, and based on the test result, it was verified that the cushioning material could be used without any problem for packaged freight of 5 kg or less.

Furthermore, even in the case of packaged freight of 20 kg or so, there should be no problem based on the total area of the cushioning material, while some damage could happen to the cushioning material, and the cushioning material can be adequately used.

TABLE 6

Drop and impact test of packages by dynamic load.

| Drop point | A G | B G | C G |
|---|---|---|---|
| 3 faces × 1 | 33.27 | 32.55 | 27.91 |
| 3 faces × 2 | 36.36 | 39.76 | 29.97 |
| 3 faces × 3 | 37.39 | 42.85 | 32.55 |

TABLE 6-continued

Drop and impact test of packages by dynamic load.

| Drop point | A G | B G | C G |
|---|---|---|---|
| 3 faces × 4 | 33.78 | 49.75 | 24.51 |
| 3 faces × 5 | 35.33 | 43.88 | 29.46 |
| 3 faces × 6 | 39.24 | 49.75 | 29.15 |
| 3 faces × 7 | 45.42 | 43.36 | 30.49 |
| 3 faces × 8 | 46.14 | 44.91 | 31.21 |
| 3 faces × 9 | 45.63 | 47.69 | 29.66 |
| 3 faces × 10 | 50.26 | 47.17 | 35.64 |
| 3 faces × 11 | 48.20 | 44.91 | 32.75 |
| 3 faces × 12 | 42.02 | 54.18 | 32.55 |
| 3 faces × 13 | 49.75 | 50.06 | 27.40 |
| 3 faces × 14 | 46.66 | 54.38 | 30.69 |
| 3 faces × 15 | 51.50 | 51.29 | 34.81 |
| 3 faces × 16 | 57.90 | 53.87 | 37.18 |
| 3 faces × 17 | 61.80 | 57.47 | 35.84 |
| 3 faces × 18 | 58.81 | 63.14 | 34.30 |
| 3 faces × 19 | 63.14 | 66.02 | 39.76 |
| 3 faces × 20 | 61.80 | 61.39 | 43.36 |

TABLE 7

| Package | Cushioning material burst after 20 drops. |
|---|---|
| A | 0 |
| B | 2 |
| C | 4 |

TABLE 8

Acceleration change rate (%).

| Package | 1 time | 5 times | 10 times | 15 times | 20 times |
|---|---|---|---|---|---|
| A | 0 | 106 | 151 | 155 | 186 |
| B | 0 | 134 | 145 | 158 | 188 |
| C | 0 | 108 | 117 | 125 | 155 |

Effects of the invention

The laminated paper under this invention has high air permeability and has high air tightness, equivalent to that of polyethylene/nylon film. Furthermore, as the water soluble PVA film dissolves in water, it is an environment friendly material which is easy to dispose and recyclable.

Furthermore, as there is no static electricity generated based on the characteristics of the paper base and the PVA film, there will be no problem in printing and conversion processes.

TABLE 1

1/2

| | Thickness (μm) | Tensile strength (lengthwise/crosswise) (kg/15 mm) | Break stretch (lengthwise/crosswise) (%) | Air permeability (10,000 seconds/ 100 ml) | Softness (lengthwise) (g) | TEA (lengthwise/crosswise) (kg.m/m²) |
|---|---|---|---|---|---|---|
| Embodiment Example 1, 30 μm film | 69.3 | 4.04/3.15 | 24.2/11.4 | 170 | 38.3 | 65.2/80.3 |
| Embodiment Example 2, 20 μm extrusion | 54.9 | 4.65/4.03 | 2.8/8.7 | 163 | 34.0 | 17.5/44.2 |

TABLE 1-continued

1/2

|  | Thickness (μm) | Tensile strength (lengthwise/crosswise) (kg/15 mm) | Break stretch (lengthwise/crosswise) (%) | Air permeability (10,000 seconds/ 100 ml) | Softness (lengthwise) (g) | TEA (lengthwise/crosswise) (kg.m/m$^2$) |
|---|---|---|---|---|---|---|
| Embodiment Example 3, 40 μm extrusion | 72.6 | 4.65/4.07 | 2.7/8.7 | 171 | 35.5 | 17.5/44.7 |
| Embodiment Example 4, 30 μm film | 96.2 | 1.16/0.68 | 373/412 | 80 | 24.3 | 723/566 |
| Embodiment Example 5, 35 μm extrusion | 85.9 | 1.06/0.40 | 4.5/7.6 | 84 | 23.0 | 213/55.0 |
| Embodiment Example 6, 15 μm extrusion | 72.3 | 0.92/0.38 | 100/42.6 | 92 | 24.3 | 155/32.7 |
| Embodiment Example 7, 15 μm extrusion | 68.3 | 1.73/0.37 | 37.0/25.1 | 104 | 27.0 | 107/18.8 |
| Comparison Example 1, 15 μm extrusion | 116.0 | 5.35/0.88 | 19.1/13.4 | 175 | — | 171/23.8 |
| Comparison Example 2, 20 μm extrusion | 120.6 | 2.85/0.95 | 80.0/67.7 | 146 | — | 64.2/56.7 |
| Comparison Example 3, 40 μm extrusion | 232.2 | 4.99/1.67 | 70.6/54.4 | 135 | — | 92.9/67.6 |

We claim:

1. A laminated paper for use in making cushioning material, said laminated paper comprising a paper base; and a water soluble polyvinyl alcohol layer laminated over an entire surface of said paper base; said laminated paper having a total thickness of 40–100 μm, an air permeability of at least 800,000 seconds/100 ml, and a lengthwise softness of 50 g or less.

2. The laminated paper as claimed in claim 1, wherein the polyvinyl alcohol layer consists of polyvinyl alcohol strain adhesive and polyvinyl alcohol film, and the layer thickness is 15–40 μm.

3. The laminated paper as claimed in claim 1, wherein the polyvinyl alcohol layer is provided by extrusion lamination of polyvinyl alcohol resin.

4. The laminated paper as claimed in claim 1, wherein the laminated paper has an air permeability of 870,000 seconds/ 100 ml or higher.

5. The laminated paper as claimed in claim 1, wherein the laminated paper has an air permeability of 1,000,000 seconds/100 ml or higher.

6. The laminated paper as claimed in claim 1, wherein the laminated paper lengthwise softness is 40 g or less.

7. The laminated paper as claimed in claim 1, wherein the laminated paper has a weight of 50 g/m$^2$ or less.

8. The laminated paper as claimed in claim 7, wherein the laminated paper has a weight of 35 g/m$^2$.

9. The laminated paper as claimed in claim 7, wherein the laminated paper has a weight of 30 g/m$^2$.

* * * * *